United States Patent
Churchyard

(10) Patent No.: US 6,510,448 B1
(45) Date of Patent: Jan. 21, 2003

(54) SYSTEM, METHOD AND COMPUTER PROGRAM PRODUCT FOR INCREASING THE PERFORMANCE OF A PROXY SERVER

(75) Inventor: Peter J. Churchyard, Mt. Airy, MD (US)

(73) Assignee: Networks Associates Technology, Inc., Santa Clara, CA (US)

(*) Notice: Subject to any disclaimer, the term of this patent is extended or adjusted under 35 U.S.C. 154(b) by 0 days.

(21) Appl. No.: 09/495,158

(22) Filed: Jan. 31, 2000

(51) Int. Cl.$^7$ .............................................. G06T 15/16
(52) U.S. Cl. ...................... 709/108; 709/328; 712/228; 717/131; 717/154
(58) Field of Search ................................ 713/200–202, 713/154; 709/100–108, 328; 712/220–228; 717/154, 130–131

(56) References Cited

U.S. PATENT DOCUMENTS

| | | | | |
|---|---|---|---|---|
| 5,367,680 A | * | 11/1994 | Flurry et al. | 709/108 |
| 5,388,219 A | * | 2/1995 | Chan et al. | 709/100 |
| 5,941,988 A | * | 8/1999 | Bhagwat et al. | 713/201 |
| 6,141,755 A | * | 1/2000 | Dowd et al. | 713/200 |
| 6,374,286 B1 | * | 4/2002 | Gee et al. | 709/108 |

* cited by examiner

Primary Examiner—Tuan Q. Dam
Assistant Examiner—Chuck Kendall
(74) Attorney, Agent, or Firm—Silicon Valley IP Group, LLC; Kevin J. Zilka; Christopher J. Hamaty

(57) ABSTRACT

A software virtual machine mechanism that increases the efficiency of context switching is disclosed. In an application to the networking environment, the software virtual machine is operative to increase the efficiency of handling input/output operations through the improved control of switching between contexts. The software virtual machine supports restartable instructions such that the resumption of a previously blocked context will continue at the instruction that had previously blocked.

13 Claims, 4 Drawing Sheets

SYSTEM, METHOD AND COMPUTER PROGRAM PRODUCT FOR INCREASING THE PERFORMANCE OF A PROXY SERVER

BACKGROUND

1. Field of the Invention

The present invention relates generally to the control of process and threads, and more particularly, to the implementation of a virtual machine in a network environment for the efficient control of input/output processes and threads.

2. Discussion of the Related Art

Firewalls are an essential ingredient in a corporate entity's network security plan. Firewalls represent a security enforcement point that separates a trusted network from an untrusted network. FIG. 1 illustrates a generic example of a network security plan that incorporates a firewall system. In this generic example, firewall system 120 is operative to screen all connections between private network 110 and untrusted system 140. These connections are facilitated by Internet network 130. In the screening process, firewall system 120 determines which traffic should be allowed and which traffic should be disallowed based on a predetermined security policy.

One type of firewall system is an application-level gateway or proxy server, which acts as a relay of application-level traffic. Proxy servers tend to be more secure than packet filters. Rather than trying to deal with the numerous possible combinations that are to be allowed and forbidden at the transmission control protocol (TCP) and Internet protocol (IP) level, the proxy server need only scrutinize a few allowable applications (e.g., Telnet, file transfer protocol (FTP), simple mail transfer protocol (SMTP), hypertext transfer protocol (HTTP), etc.). Generally, if the proxy server does not implement the proxy code for a specific application, the service is not supported and cannot be forwarded across the firewall.

As compared to packet screening, proxies can be flexibly applied to generate a customized network security policy. The performance of process and thread-based proxies, however, is well below that of packet screening. One of the primary sources of inefficiency is the proxy's inherent operation within a networking environment. As the very essence of a proxy is network input/output (I/O), frequent blocking of a process or thread can occur. For example, if a network read operation is performed and no data is available, the read operation will block. Similarly, if a network write operation is performed and the buffer is full, the write operation will block.

When a process or thread blocks, the proxy server can switch to a different process or thread. This switch is referred to as a context switch. As can be appreciated, frequent blocking of network read/write operations can result in frequent context switches. A high frequency of context switches will ultimately reduce the number of transactions per second that the proxy server can handle. Accordingly, what is needed is a mechanism for increasing the efficiency of a proxy server.

SUMMARY OF THE INVENTION

The present invention addresses the aforementioned needs by providing a software virtual machine mechanism that increases the efficiency of context switching. In an application to the networking environment, the software virtual machine is operative to increase the efficiency of handling input/output (I/O) operations through the improved control of switching between contexts. In accordance with the present invention, the overhead expense of switching between contexts is reduced through the software virtual machine support of restartable instructions. With restartable instructions, the resumption of a previously blocked context will continue at the instruction that had previously blocked.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

Figure 1:
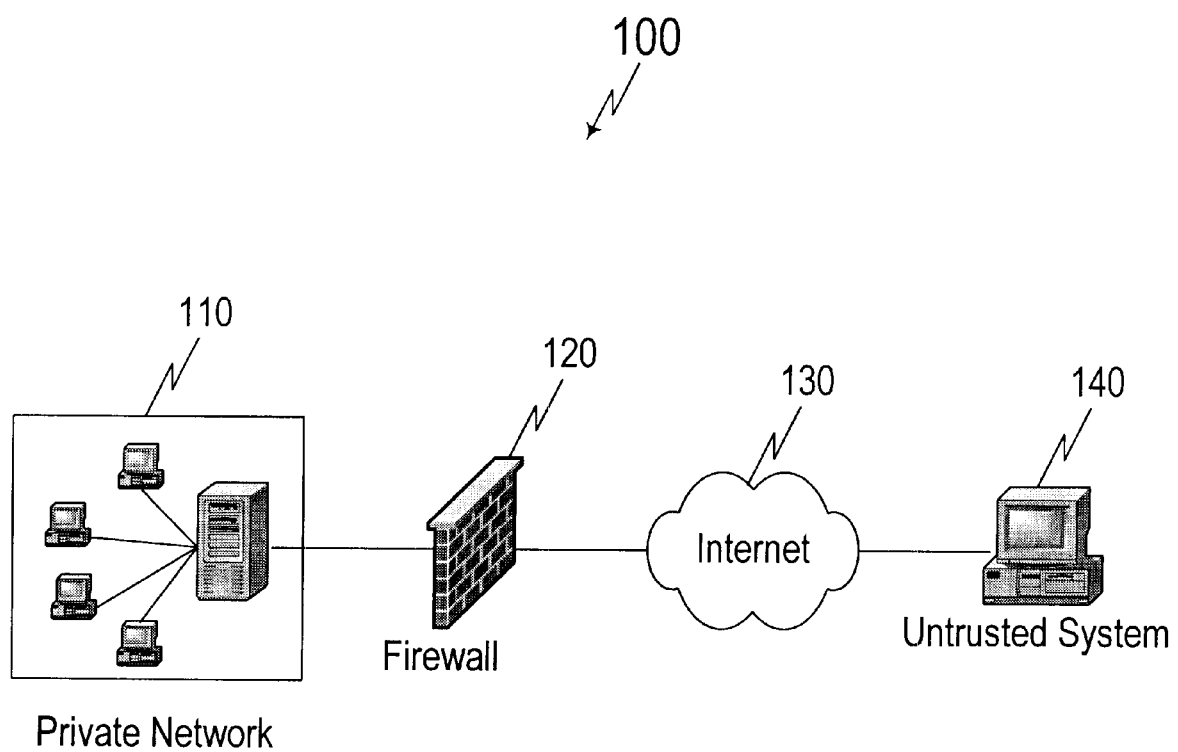
FIG. 1 illustrates a generic network security system.

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Proxy servers represent one of the basic building blocks of a corporation's network security infrastructure. The proxy server can include one or more proxies that are each tailored to govern a supported application such as Telnet, FTP, SMTP, HTTP, etc. As represented by this potential list of supported applications, the very essence of a proxy server is network I/O.

Network I/O is carried out by the various applications through network I/O system calls that seek to read or write to a network connection. These network I/O system calls will routinely block, for example, when no data is available to be read from the network connection or when the write buffer is full. The blocking of a process or thread-based proxy can prompt the server to perform a context switch to another process or thread that is runnable. A scheduler is generally tasked with the responsibility of selecting the highest priority runnable process or thread for execution. Network I/O processes or threads are typically given the high priorities.

Context switches are generally assumed to be expensive. The cost of a context switch is therefore a critical element in the creation of an efficient server. These costs are especially relevant to the performance of a proxy server that heavily relies on frequently-blocked network I/O system calls. Context switching in a networking environment is a major factor in the creation of efficient clients, servers and proxies. The high cost of context switches can have considerable influence on programming style, resulting in messy network software and "hacked" lightweight process or thread implementations. In the implementation of a network security architecture, the overall goal is to increase the integrity of the firewall proxies. Increasing the complexity of the servers and proxies only serves to increase the likelihood of flaws that allow security breaches.

In accordance with the present invention, the cost of a context switch is minimized through the application of a software virtual machine mechanism. The minimization of the cost of context switching enables a server to process an increased number of transactions per second. As will be described in greater detail below, the software virtual machine mechanism is applied to a high performance, low-overhead networking environment. The software virtual machine mechanism eliminates excess context switching costs that are often introduced in general purpose computing environments.

Consider first a general purpose UNIX environment. In a general purpose UNIX environment such as that illustrated in FIG. 2, an I/O process is generated using daemon 210. Daemon 210 is operative to receive incoming network connections 230A–230C, create a process 220, and to attach a network connection 230C to the process 220. As further illustrated, I/O process 220 is running in an environment supported by a general-purpose operating system 250. General-purpose operating system 250 includes a scheduling component (not shown) that coordinates the context switches between the various processes that are running in computing environment 200. Alternatively, I/O process 220 can be created by another process (e.g., using the fork command). I/O process 220 generally includes all resources (e.g., memory, page tables, etc.) that I/O process 220 is using. When I/O process 220 blocks, for example, when no data is available to be read from network connection 230C, operating system 250 coordinates a context switch using a process scheduler. Context switching in computing environment 200 is computationally expensive due to the heavy nature of I/O process 220 and the general-purpose nature of operating system 250. More specifically, the state of a blocked process must be saved in a context switch to enable the blocked process to properly continue when it is rescheduled. This computational expense serves to reduce the ability of computing environment 200 to effectively process a heavy load of transactions received by the proxy server.

Figure 2:
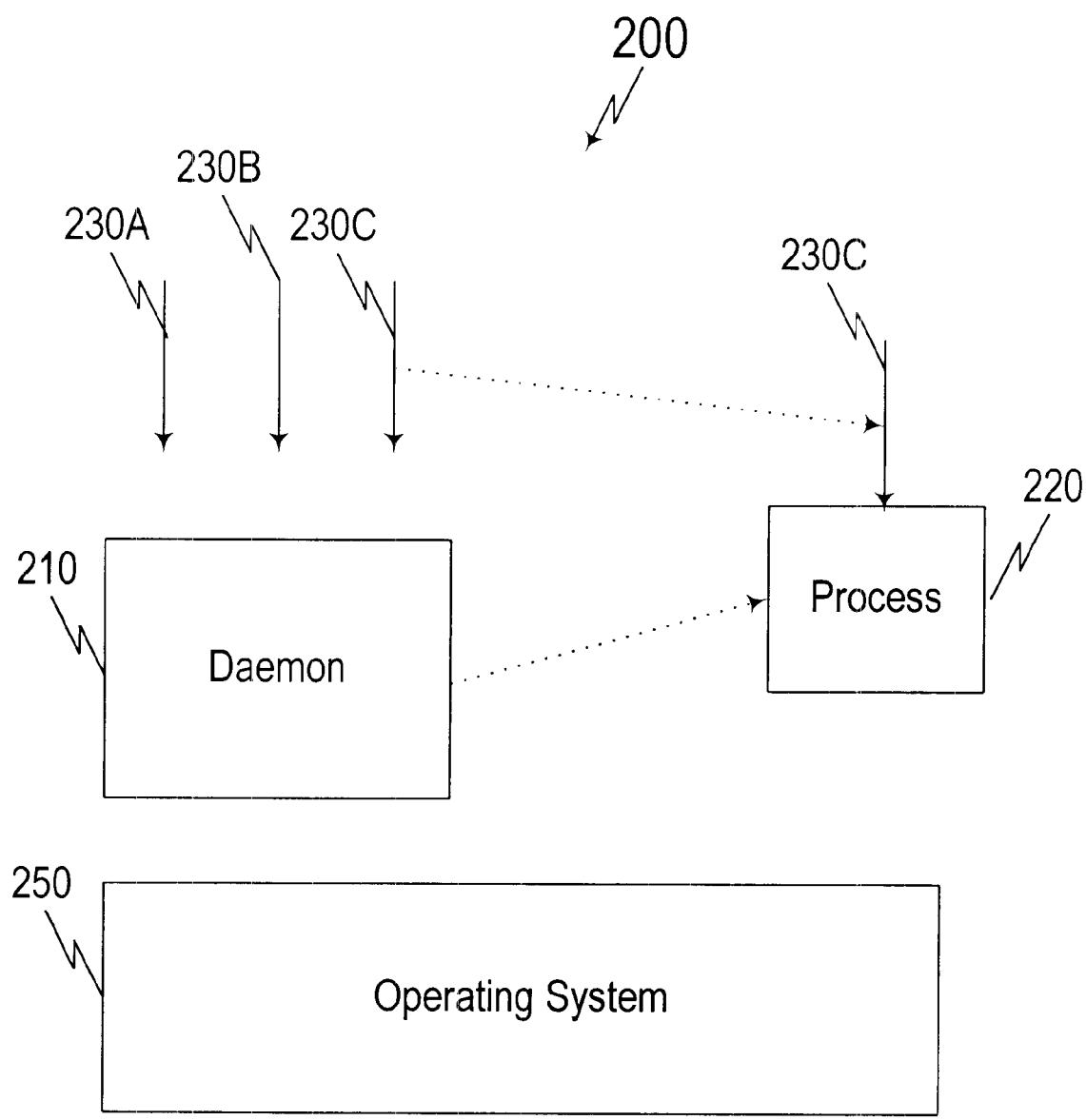
FIG. 2 illustrates the creation of an input/output (I/O) process.
Figure 3:
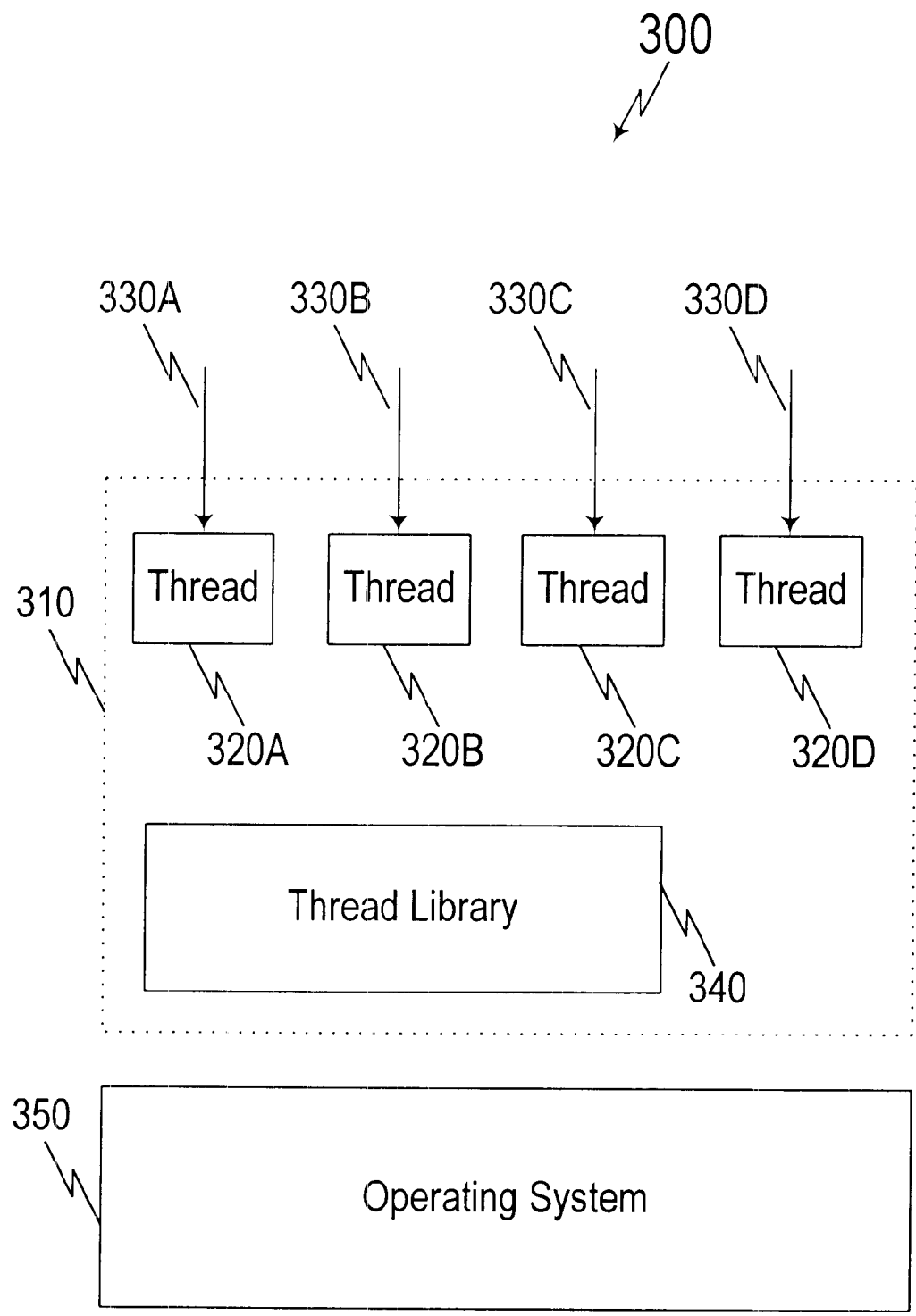
FIG. 3 illustrates a multi-threaded implementation of a networking environment.

As an alternative to the I/O process implementation illustrated in FIG. 2, a proxy server can implement thread-based proxies. FIG. 3 illustrates a multi-threaded application. 310. In this implementation, multiple threads 320A–320D are created, wherein each thread is attached to a respective network connection 330A–330D. Threads 320A–320D are relatively lightweight as compared to I/O process 220 because threads 320A–320D share the same virtual memory space. Thus, during a context switch between threads 320A–320D, the context state need not be saved. This computational savings enables computing environment 300 to switch between threads more efficiently as compared to switching between processes in computing environment 200.

Control over the context switching is effected through thread library 340. Thread library 340 represents a mini operating system that is heavily tied into general-purpose operating system 350. As thread library 340 is based on general-purpose operating system 350, it may consist of approximately 10,000 lines of code. In general, thread library 340 replicates the operating system application programming interface (API) and provides mutual exclusion and scheduling for threads 320A–320D.

As noted, thread library 340 is based on general-purpose operating system 350. The general-purpose nature of operating system 350 dictates that thread library 340 is also a general-purpose thread library. This general-purpose thread library includes a lot of overhead that is not needed in a networking application. Due to this overhead, the efficiency of thread library 340 is reduced in environments where it is responsible for the scheduling and control of threads 320A–320D that implement networking protocols.

In accordance with the present invention, a software virtual machine is used to create a specialized computing platform that is designed to increase the efficiency of a server operating in a networking environment. The software virtual machine is tailored to the networking environment and provides a high-performance, low-overhead control mechanism for implementing efficient clients, servers and proxies for networking protocols. As will become apparent from the following description, the concepts embodied in the software virtual machine can be applied to increase the efficiency of a server in any targeted application environment that can benefit from the improved control of processes and threads.

Figure 4:
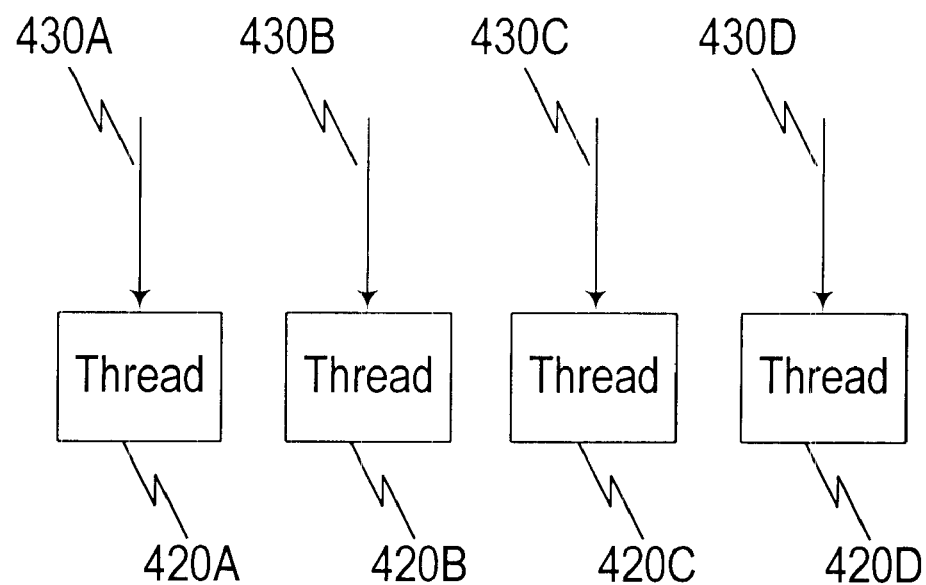
FIG. 4 illustrates a software virtual machine that controls lightweight threads in a networking environment.
Figure 4:
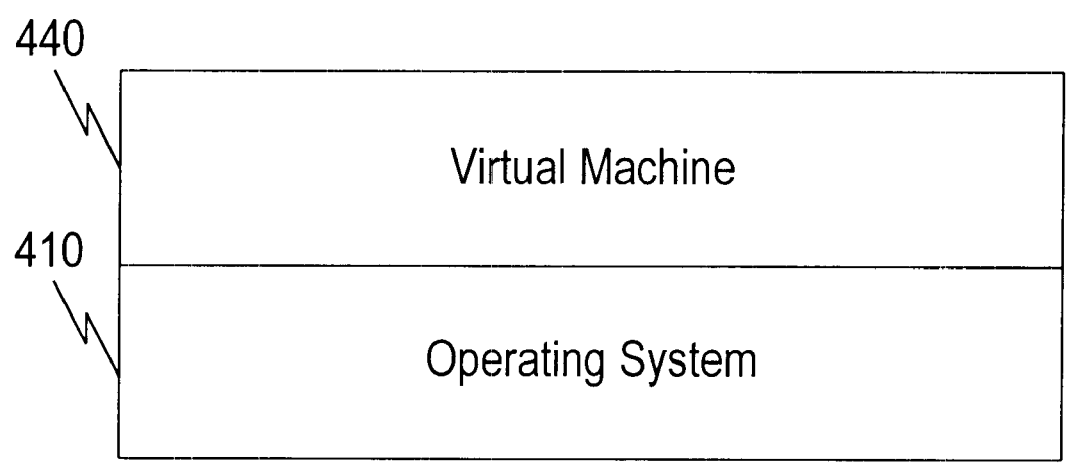

An embodiment of the present invention is illustrated in FIG. 4. In the illustrated embodiment, a software virtual machine 440 is provided which enables the implementation of lightweight threads 420A–420D without a general-purpose thread library. The lightweight nature of the implementation is enabled through the dedicated support of proxy applications, not the general support of general-purpose applications.

Generally, software virtual machines enable an application program to execute instructions that are emulated by the operating system rather than being directly executed by a central processing unit (CPU). Conventionally, application programs that are written for the computer must be translated (or compiled) into machine instructions for the specific type of CPU. The compiled programs will no longer work if they are run on a different type of CPU, because a different CPU may not understand the same set of machine instructions. A software virtual machine is a software program that behaves just like a CPU chip. It is referred to as "virtual" because a CPU chip is not actually executing the instructions. Rather, the software virtual machine is executing the instructions. Programmers can therefore write programs for the virtual machine such that the programs are independent of the underlying real physical hardware upon which the virtual machine operates.

Although software virtual machines are well known, software virtual machines such as Smalltalk and Java are still general-purpose computing platforms. These general-purpose computing platforms include a lot of overhead that is not needed in a given application.

In accordance with the present invention, a proxy virtual machine is provided which has instructions and an execution profile that are optimized for network I/O. It is a feature of the present invention that the I/O instructions in the proxy virtual machine are designed to be restartable. As will be described in greater detail below, the restartable instructions help to minimize the processing overhead.

With restartable instructions, if the I/O instruction blocks in a particular context, the instruction pointer remains pointing at the I/O instruction and the execution context yields. Upon a switch back to that context, the I/O instruction is re-started. This restartability feature minimizes the cost of context switching and serves to increase the number of transactions that a server can process.

This feature of instruction restartability is now described with reference to the following example subroutine:

```
1       void pvmNext( )
2       {       int ret;
3               ppvm curr = (ppvm)pvm_contextq->data;
4               ret = 0;
5               while(ret == 0) {
6                       numinst++;
7                       curr->nextip = &curr->ip[1];
8                       ret = (**(curr)->ip) ( );
9                       if( ret == 0) {
10                              curr->ip = curr->nextip);
11                      } else {
12                              if( pvm_contextq == NULL)
13                                      break;
14                              pvm_contextq = pvm_contextq->next;
15                              curr = (ppvm)pvm_contextq->data;
16                              while(curr->events) {
17                                      pvm_contextq = pvm_contextq->next;
18                                      curr = (ppvm)pvm_contextq->data;
19                              }
20                      }
21              }
22      }
```

The pvmNext( ) subroutine is generally responsible for determining whether a current context should yield to another context. As part of this process, the pvmNext( ) subroutine is also responsible for holding an instruction pointer at a blocked instruction.

The pvmNext( ) subroutine begins at line 2 by declaring a local variable ret. The local varible ret is used by the pvmNext( ) subroutine in determining whether the next instruction should be executed or whether a context switch should be effected. At line 3, the local context is retrieved and assigned as curr. Next, ret is initialized to "0" at line 4 and the while loop of lines 5–21 is entered.

Within the while loop, at line 6, an instruction counter is incremented, and at line 7, the instruction pointer value for the next instruction is identified. At line 8, the current instruction is executed through a function call via a pointer. As the pvmNext( ) subroutine is part of a software virtual machine, the instruction that is executed through the function call at line 8 is a virtual instruction. The returned result of the virtual instruction is assigned to the variable ret.

The simplest example of a virtual instruction is defined as follows:

```
1       int pvm_noop (void)
2       {
3               return 0;
4       }
```

The pvm_noop virtual instruction does not perform any operations. As illustrated in line 3 of the pvm_noop virtual instruction, the value "0" is returned by the virtual instruction. The return value of "0" is used in the if statement at line 9 of the pvmNext( ) subroutine to determine whether a context switch should occur. If the virtual instruction returns a "0", then no context switch is required. More specifically, at line 9 of the pvmNext( ) subroutine, ret is determined to be equal to "0" and the instruction pointer is advanced at line 10 using the previous instruction identification at line 7. With a return value of "0", the while loop of lines 5–21 continues in the next iteration where the next instruction is executed.

If the statement at line 9 determines that the virtual instruction returns a non-zero value, then a context switch is performed. The context switch is handled by lines 12–18 of the pvmNext( ) subroutine. In one embodiment, the virtual instructions can be designed to return a value of –1, 0, or +1. As noted above, if the virtual instruction returns a "0", then no context switch is required and the next instruction is executed in the next iteration of the while loop. If the virtual instruction returns a "–1," then the current context should be killed. Alternatively, if the virtual instruction returns a "+1," then the current context should yield to another context that should be run.

Significantly, it should be noted that upon a return of a "+1" and the subsequent context switch, the instruction pointer for the yielding context is not advanced. In other words, because ret is not equal to "0," line 10 of the pvmNext( ) subroutine does not advance the instruction pointer to the next instruction. In this manner, the instruction pointer for the yielding context remains at the instruction that previously blocked. Thus, when a context switch occurs back to the previously yielding context, the thread of execution will immediately commence with the instruction that previously blocked.

In general, the restartability of the instructions enables the software virtual machine to increase the performance and ultimate throughput of the proxy server. Significantly, this restartability is implemented in software such as that exemplified by the pvmNext( ) subroutine. Thus, the restartability is not limited to hardware-only based CPU level interrupts. Any virtual instruction can be tailored to trigger the restartable functionality. In this manner, greater flexibility in the control of the instructions is thereby enabled through the software implementations described above.

While the invention has been described in detail and with reference to specific embodiments thereof, it will be apparent to one skilled in the art that various changes and modifications can be made therein without departing from the spirit and scope thereof. For example, in various embodiments, the software virtual machine can be encoded using byte codes, indirect threading, or direct threading. Thus, it is intended that the present invention cover the modifications and variations of this invention provided they come within the scope of the appended claims and their equivalents.

What is claimed is:

1. A computer system having a context switching mechanism, comprising:

at least one context running on the computer system; and a software virtual machine that is operative to switch contexts based upon a determination of whether a first context has blocked at an instruction;

wherein said determination is based on a virtual instruction, an instruction pointer is maintained at said blocked instruction, and the contexts are switched by killing said first context if said virtual instruction returns a predetermined value;

wherein upon a context switch from a second context back to said first context, said software virtual machine enables the computer system to resume said first context at said instruction.

2. The computer system of claim 1, wherein said software virtual machine is encoded using byte codes.

3. The computer system of claim 1, wherein said software virtual machine is encoded using indirect threading.

4. The computer system of claim 1, wherein said software virtual machine is encoded using direct threading.

5. The computer system of claim 1, wherein said computer system is a network firewall system.

6. The computer system of claim 5, wherein said first context blocks at a network read or write operation.

7. The computer system of claim 5, wherein said software virtual machine switches contexts based upon a return of a non-zero value.

8. In a computer system having a software virtual machine, a context switching method, comprising:

determining whether a first context has blocked at an instruction based on a virtual instruction;

maintaining an instruction pointer at said blocked instruction;

switching, under the control of the software virtual machine, contexts from said first context to a second context based upon said determination by killing said first context if said virtual instruction returns a predetermined value; and upon a context switch back to said first context, resuming said first context at said instruction.

9. The method of claim 8, wherein step (a) comprises the step of determining whether said virtual instruction returns a non-zero value.

10. In a computer system having a software virtual machine, a context switching method, comprising:

determining whether a first context has blocked at an instruction, wherein it is determined whether a virtual instruction returns a non-zero value;

maintaining an instruction pointer at said blocked instruction when said virtual instruction returns the non-zero value;

switching, under the control of the software virtual machine, contexts from said first context to a second context based upon said determination by killing said first context if said virtual instruction returns a negative value; and upon a context switch back to said first context,. resuming said first context at said instruction.

11. A computer program product comprising:

computer-readable program code for causing a computer to determine whether a first context has blocked at an instruction based on a virtual instruction;

computer-readable program code for maintaining an instruction pointer at said blocked instruction;

computer-readable program code for causing a computer to switch contexts from said first context to a second context based upon said determination by killing said first context if said virtual instruction returns a predetermined value;

computer-readable program code for causing a computer to resume said first context at said instruction upon a context switch back to said first context; and a computer-usable medium configured to store the computer-readable program codes.

12. A method for enabling a computer to implement a software virtual machine, comprising:

transmitting computer-readable program code to a computer, said computer-readable program code including:

computer-readable program code for causing a computer to determine whether a first context has blocked at an instruction based on a virtual instruction;

computer-readable program code for maintaining an instruction pointer at said blocked instruction;

computer-readable program code for causing a computer to switch contexts from said first context to a second context based upon said determination by killing said first context if said virtual instruction returns a predetermined value; and computer-readable program code for causing a computer to resume said first context at said instruction upon a context switch back to said first context.

13. A computer data signal embodied in a transmission medium comprising:

computer-readable program code for causing a computer to determine whether a first context has blocked at an instruction based on a virtual instruction;

computer-readable program code for maintaining an instruction pointer at said blocked instruction;

computer-readable program code for causing a computer to switch contexts from said first context to a second context based upon said determination by killing said first context if said virtual instruction returns a predetermined value; and computer-readable program code for causing a computer to resume said first context at said instruction upon a context switch back to said first context.

* * * * *

UNITED STATES PATENT AND TRADEMARK OFFICE
CERTIFICATE OF CORRECTION

| | | |
|---|---|---|
| PATENT NO. | : 6,510,448 B1 | Page 1 of 1 |
| APPLICATION NO. | : 09/495158 | |
| DATED | : January 21, 2003 | |
| INVENTOR(S) | : Churchyard | |

It is certified that error appears in the above-identified patent and that said Letters Patent is hereby corrected as shown below:

In the claims:

col. 3, lines 39-40, replace "application." with --application--;
col. 5, line 29, replace "varible" with --variable--;
col. 6, line 26, insert a spaces after "of";
col. 6, line 26, insert a space after "or";
col. 8, line 1, replace "context,." with --context,--.

Signed and Sealed this

Twenty-fifth Day of January, 2011

David J. Kappos
*Director of the United States Patent and Trademark Office*